(12) United States Patent
Ohta (10) Patent No.: US 10,366,603 B2
(45) Date of Patent: Jul. 30, 2019

(54) RECOGNITION SUPPORT DEVICE FOR VEHICLE

(71) Applicant: TOYOTA JIDOSHA KABUSHIKI KAISHA, Toyota-shi, Aichi-ken (JP)

(72) Inventor: Teppei Ohta, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/121,385

(22) Filed: Sep. 4, 2018

(65) Prior Publication Data

US 2019/0103017 A1 Apr. 4, 2019

(30) Foreign Application Priority Data

Oct. 2, 2017 (JP) ................. 2017-192886

(51) Int. Cl.
| | |
|---|---|
| G08G 1/005 | (2006.01) |
| G08G 1/04 | (2006.01) |
| G08G 1/16 | (2006.01) |
| G06K 9/00 | (2006.01) |
| B60Q 1/04 | (2006.01) |

(52) U.S. Cl.
CPC ............ *G08G 1/005* (2013.01); *B60Q 1/04* (2013.01); *G06K 9/00369* (2013.01); *G06K 9/00805* (2013.01); *G08G 1/04* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 4,349,823 A | * | 9/1982 | Tagami ................ | G01S 13/931 340/815.69 |
| 5,777,563 A | * | 7/1998 | Minissale ............ | G01S 13/931 340/435 |
| 5,808,728 A | * | 9/1998 | Uehara ................ | B60T 7/22 180/169 |
| 5,999,092 A | * | 12/1999 | Smith .................. | G01S 13/931 340/436 |
| 6,055,042 A | * | 4/2000 | Sarangapani ......... | G01S 13/87 180/167 |
| 6,061,001 A | * | 5/2000 | Sugimoto ............. | B60Q 1/52 180/169 |

(Continued)

FOREIGN PATENT DOCUMENTS

| | | |
|---|---|---|
| JP | 2015-143093 A | 8/2015 |
| JP | 2017-030686 A | 2/2017 |

*Primary Examiner* — Curtis J King
(74) *Attorney, Agent, or Firm* — Sughrue Mion, PLLC (57) ABSTRACT

A recognition support device for a vehicle includes: an irradiation device which is configured to irradiate an area in front of an own vehicle with light and has an actuator configured to change an irradiation direction of the light; and circuitry configured to recognize an object present in front of the own vehicle with a sensor, to irradiate, when a specific object advances into a first area set in front of the own vehicle relative to the own vehicle, the specific object with the light by using the irradiation device and to drive the actuator, when the specific object advances into a second area which is larger at least in a width in a vehicle traveling direction than the first area before advancing into the first area, such that the irradiation direction of the light from the irradiation device faces the specific object.

8 Claims, 6 Drawing Sheets

(56) References Cited

U.S. PATENT DOCUMENTS

| | | | | |
|---|---|---|---|---|
| 6,229,597 B1* | 5/2001 | Kikuchi | G01S 7/03 | 180/169 |
| 6,281,806 B1* | 8/2001 | Smith | B60Q 1/085 | 340/436 |
| 6,580,385 B1* | 6/2003 | Winner | G01S 7/4972 | 180/169 |
| 7,275,431 B2* | 10/2007 | Zimmermann | G01S 13/87 | 342/126 |
| 7,278,505 B2* | 10/2007 | Fujioka | B60T 7/22 | 180/167 |
| 7,504,988 B2* | 3/2009 | Tsuchihashi | G01S 13/34 | 342/158 |
| 7,973,701 B2* | 7/2011 | Lohmeier | G01S 7/4004 | 342/104 |
| 8,405,541 B2* | 3/2013 | Lee | G01S 13/0209 | 342/118 |
| 8,902,103 B2* | 12/2014 | Kim | G01S 13/345 | 342/118 |
| 2002/0163463 A1* | 11/2002 | Lajiness | G01S 7/4004 | 342/70 |
| 2003/0222772 A1* | 12/2003 | Laufer | B60Q 1/0023 | 340/435 |
| 2004/0114381 A1* | 6/2004 | Salmeen | B60Q 1/085 | 362/465 |
| 2005/0111698 A1* | 5/2005 | Kawai | B60R 1/00 | 382/103 |
| 2009/0015388 A1* | 1/2009 | Yagi | B60Q 1/0035 | 340/435 |
| 2018/0004020 A1* | 1/2018 | Kunii | B60Q 1/04 | |
| 2018/0056854 A1* | 3/2018 | Kunii | B60Q 1/26 | |
| 2018/0118099 A1* | 5/2018 | Kunii | B60Q 1/04 | |

* cited by examiner

RECOGNITION SUPPORT DEVICE FOR VEHICLE

INCORPORATION BY REFERENCE

The disclosure of Japanese Patent Application No. 2017-192886 filed on Oct. 2, 2017 including the specification, drawings and abstract is incorporated herein by reference in its entirety.

BACKGROUND

1. Technical Field

The present disclosure relates to a recognition support device for a vehicle.

2. Description of Related Art

Disclosed in Japanese Patent Application Publication No. 2015-143093 is a pedestrian notification device. The pedestrian notification device determines whether or not a pedestrian is present around an own vehicle with a camera. When it is determined that the pedestrian is present, the pedestrian notification device irradiates the pedestrian who is recognized by the vehicle with marking light to notify the pedestrian that the vehicle has recognized the pedestrian.

SUMMARY

When an alert target object such as a pedestrian is irradiated with light, using an irradiation device having an actuator capable of changing the irradiation direction of light makes it possible to focus on the target object for more effective irradiation. However, in order to turn the irradiation device to the target object when irradiation is required, it takes time to drive the actuator. Accordingly, alerting the pedestrian may be delayed due to a delay in irradiation timing.

The present disclosure provides a recognition support device for a vehicle, the recognition support device being capable of effectively irradiating a specific object to be alerted with light while suppressing a delay in alerting.

An aspect of the disclosure provides a recognition support device for a vehicle, including: an irradiation device configured to irradiate an area in front of an own vehicle with light, the irradiation device having an actuator configured to change an irradiation direction of the light; and circuitry configured to recognize an object present in front of the own vehicle with a sensor, irradiate, when a specific object advances into a first area, the specific object with the light by using the irradiation device, the first area being set in front of the own vehicle relative to the own vehicle, and drive the actuator, when the specific object advances into a second area before advancing into the first area, such that the irradiation direction of the light from the irradiation device faces the specific object that advances into the second area, the second area being larger at least in a width in a vehicle traveling direction than the first area.

According to the aspect, when the specific object advanced into the second area larger at least in the width in the vehicle traveling direction than the first area before advancing the first area, the actuator is driven such that the irradiation direction of the light from the irradiation device faces the specific object that advanced into the second area. When the specific object advanced into first area after that, the specific object is irradiated with the light by using the irradiation device. When the second area having an enlarged width at least in the vehicle traveling direction is used with the first area in this way, the operating time of the actuator necessary for adjustment of the irradiation direction can easily be secured before the specific object advances into the first area after the second area. Accordingly, the present disclosure can effectively irradiate the specific object to be alerted with light, while suppressing a delay in alerting.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below with reference to the drawings. Note that elements identical in each of the drawings are designated by identical reference signs to omit redundant description. When the numerals, such as the number, the quantity, the amount, and the range of the elements, are mentioned in the embodiments described below, the mentioned numerals do not limit the present disclosure unless otherwise clarified or unless otherwise clearly and theoretically specified by the numerals. The constituents such as structures and steps described in the embodiments described below are not necessarily essential for the present disclosure unless otherwise clarified or unless otherwise clearly and theoretically specified by the constituents.

First Embodiment

1. Configuration of Recognition Support Device for Vehicle

A recognition support device for a vehicle according to an embodiment of the present disclosure is a device for supporting mutual cognition between an own vehicle (driver) to which the device is applied and a "specific object" to be alerted. Examples of the "specific object" to be alerted include persons (such as pedestrians and bicycles) and animals. Hereinafter, the present embodiment will be described with the pedestrians as the target object.

Figure 1:
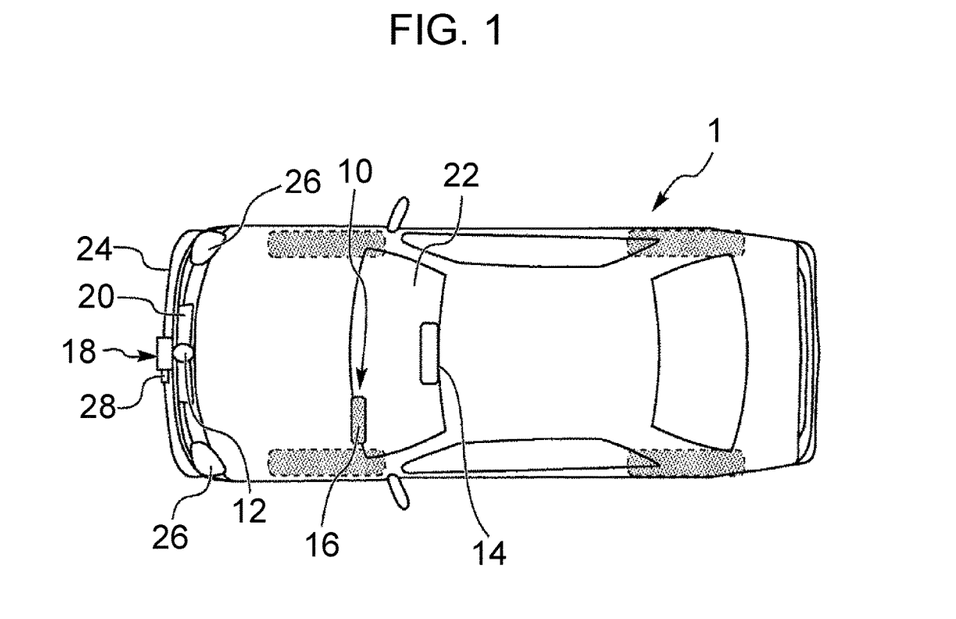
FIG. 1 is a schematic view illustrating an example of a vehicle to which a recognition support device for a vehicle according to a first embodiment of the present disclosure is applied.

FIG. 1 is a schematic view illustrating an example of a vehicle 1 to which the recognition support device 10 for a vehicle according to the first embodiment of the present disclosure is applied.

As illustrated in FIG. 1, the vehicle 1 is mounted with the recognition support device for a vehicle (simply referred to as "recognition support device" for short below) 10. The vehicle 1 is equipped with various sensors (illustration omitted) that acquire the information about the motion state of the vehicle 1 (such as a vehicle speed) and various sensors that acquire the information about the environments and objects around the vehicle 1. Examples of the latter sensors include a millimeter-wave sensor 12 and a camera sensor 14. The recognition support device 10 includes an electronic control unit (ECU) 16 and an irradiation device 18.

1-1. Sensor

The millimeter-wave sensor 12 and the camera sensor 14 can be used for recognition of objects (peripheral objects) present in front of the own vehicle 1.

Specifically, the millimeter-wave sensor 12 is provided in a front grille 20 of the vehicle 1 in one example. The millimeter-wave sensor 12 is used to determine the presence of an object around the own vehicle 1 and to acquire peripheral object information, including a distance between the own vehicle 1 and a peripheral object, and a relative speed of the own vehicle 1 relative to the peripheral object.

The camera sensor 14 is provided in a windshield glass 22 of the vehicle 1 in one example. Images photographed by the camera sensor 14 are used for distinguishing objects to be photographed (for example, pedestrians, bicycles, and other vehicles). The camera sensor 14 is configured as a stereoscopic camera that can measure the distance from the own vehicle 1 to the object to be photographed in one example.

1-2. ECU

The ECU 16 includes a processor, a memory, and an input-output interface. The millimeter-wave sensor 12 and the camera sensor 14 are connected to the ECU 16 directly or through a communication network, such as a controller area network (CAN) constructed in the vehicle 1. The information acquired by the sensors 12, 14 is repeatedly transmitted at a specified period to the ECU 16.

1-3. Irradiation Device

The irradiation device 18 is attached to a front bumper 24 of the vehicle 1 to irradiate an area in front of the own vehicle 1 with light in one example. For example, the irradiation device 18 may be placed inside a head lamp unit 26. The irradiation device 18 includes an actuator 28 that can change the irradiation direction of the light. In one example, the actuator 28 has a mechanism that can freely adjust the irradiation direction in a width direction and a vertical direction of the vehicle 1 by using an electric motor. Such an actuator 28 can effectively irradiate a pedestrian to be alerted with light, regardless of the position of the pedestrian.

The shape of the irradiation light from the irradiation device 18 is not particularly limited. For example, light with a high directivity, such as a laser beam, can be used. Alternatively, guide light for guiding the pedestrian (for example, light shaped to indicate that the pedestrian can cross (such as crosswalk-shaped light)), or light shaped to urge the pedestrian to stop may be used.

1-4. Specific Configuration of Recognition Support Device for Vehicle

Figure 2:
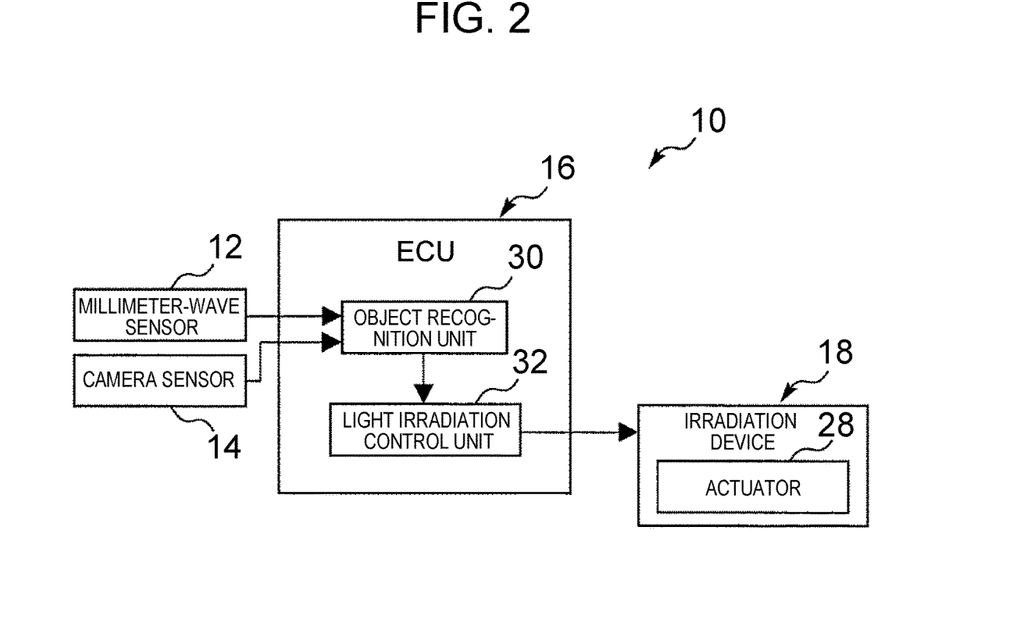
FIG. 2 is a block diagram illustrating one example of a specific configuration of the recognition support device for a vehicle according to the embodiment of the present disclosure.

FIG. 2 is a block diagram illustrating one example of a specific configuration of the recognition support device 10 for a vehicle according to the embodiment of the present disclosure. The ECU 16 includes an object recognition unit 30 and a light irradiation control unit 32 as functional blocks relating to mutual recognition support control in the present embodiment. The functional blocks are not present as hardware in the recognition support device 10. The functional blocks are implemented as software when a program stored in the memory is executed by the processor.

Object Recognition Unit

The object recognition unit 30 implements the function of recognizing an object that is present in front of the own vehicle 1 by using the millimeter-wave sensor 12 and the camera sensor 14 in one example. Specifically, the object recognition unit 30 receives images around the own vehicle 1 from the camera sensor 14 through the input-output interface. The object recognition unit 30 distinguishes the object by applying specified image recognition processing to the received images. The object recognition unit 30 also acquires other various peripheral object information (such as a distance between the own vehicle 1 and the peripheral object, and a relative speed of the own vehicle 1 relative to the peripheral object) with the millimeter-wave sensor 12 and the camera sensor 14.

Light Irradiation Control Unit

When an object recognized by the object recognition unit 30 is a pedestrian to be an alert target, the light irradiation control unit 32 irradiates the pedestrian with light by using the irradiation device 18. Examples of irradiation of the pedestrian may include an example of irradiating the pedestrian himself or herself or a road around the pedestrian with marking light having a given shape (for example, the linear light described before). A technique to determine whether or not the pedestrian recognized by the object recognition unit 30 is a pedestrian to be alerted (i.e., a pedestrian who needs to be alerted) is described later with reference to FIG. 3 below.

The light irradiation control unit 32 controls the actuator 28 such that the irradiation direction faces the pedestrian who is determined as an alert candidate, prior to execution of light irradiation.

2. Mutual Recognition Support Control (Light Irradiation Control) in First Embodiment The mutual recognition support control performed between the vehicle 1 (driver) and the pedestrian in the present embodiment is "light irradiation control" that irradiates the pedestrian to be alerted (corresponding to the example of "specific object" according to the present disclosure) with light in the nighttime, for example. The light irradiation control includes driving of the actuator 28 for adjustment of the irradiation direction, and execution of irradiation. Such light irradiation control can inform the pedestrian of the fact that the vehicle 1 approached the pedestrian and that the vehicle 1 recognized the pedestrian, and can also inform the driver of the existence of the pedestrian.

Figure 3:
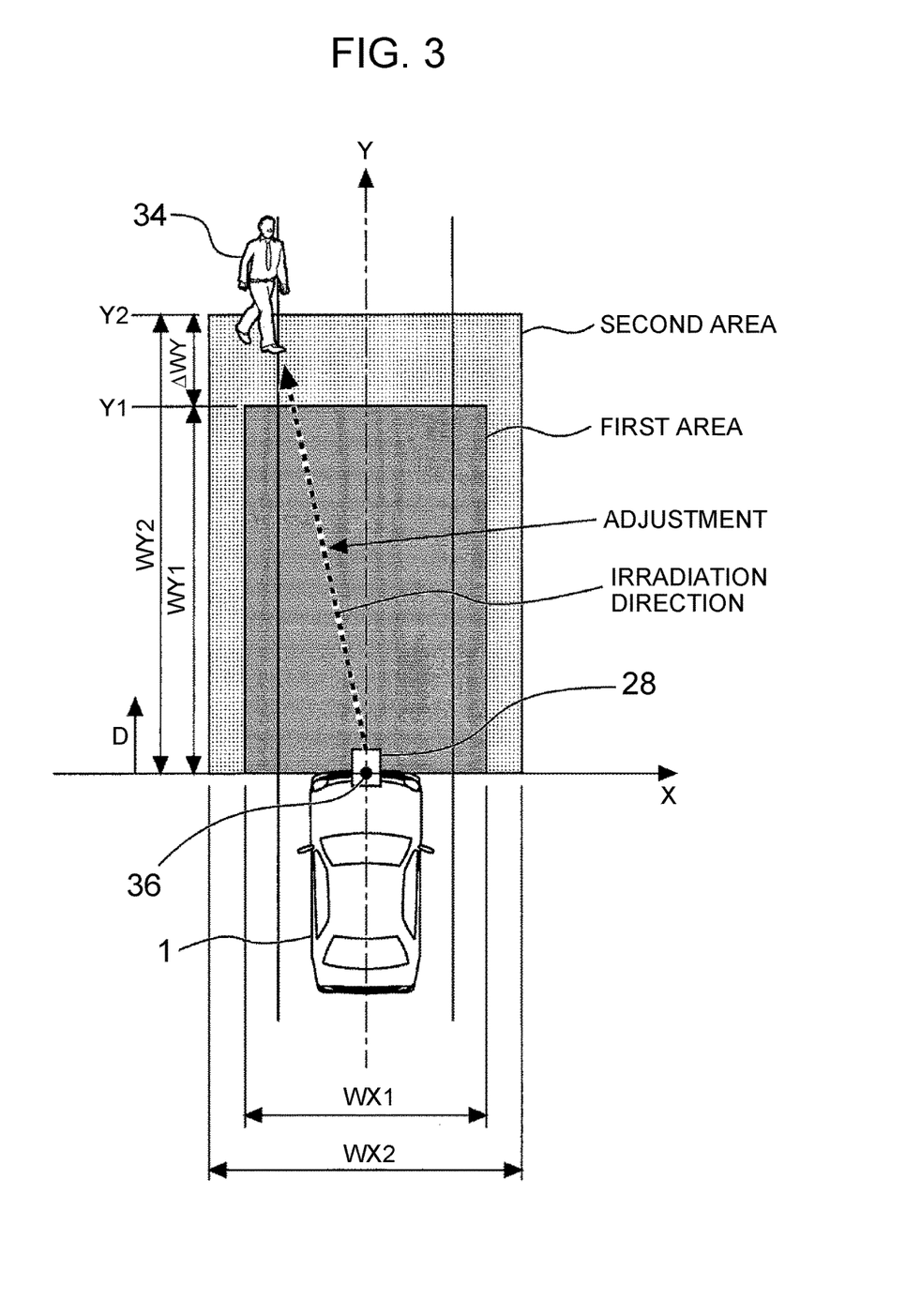
FIG. 3 illustrates examples of a first area and a second area used for light irradiation control.

FIG. 3 illustrates examples of a first area and a second area used for light irradiation control. FIG. 3 illustrates the own vehicle 1 and a pedestrian 34 depicted on an own vehicle coordinate system constructed in the ECU 16. The own vehicle coordinate system has an X axis in the width direction of the own vehicle 1 (vehicle width direction) around a reference point 36 set at the center of the front end of the own vehicle 1, and a Y axis in the travelling direction of the own vehicle 1 (simply referred to as "vehicle traveling direction" below).

2-1. First Area

In FIG. 3, the first area is set in front of the own vehicle 1 in the own vehicle coordinate system with the reference point 36 as an origin. The first area is used to determine whether or not the pedestrian 34 recognized by the object recognition unit 30 is a pedestrian to be alerted (in other words, whether or not the timing of light irradiation has come).

More specifically, when the pedestrian 34 recognized by the object recognition unit 30 advances into the first area, the pedestrian 34 who advanced into the first area is identified as a pedestrian to be alerted, and light irradiation is executed. It may further be added that the presence of the pedestrian 34 advancing into the first area is determined in order to determine that the possibility of a collision of the pedestrian 34 with the own vehicle 1 is above a certain level and the necessary time allowed for the driver to avoid the collision is about to expire.

A technique for setting the first area will be described. First, a width WX1 of the first area in the X axis direction (vehicle width direction) relative to the reference point 36 is a predetermined fixed value in one example. To determine a width WY1 of the first area in the Y axis direction (vehicle traveling direction) relative to the reference point 36, parameters such as a distance D and a time to collision TTC may be used as described below. The distance D is a distance from the reference point 36 in the vehicle traveling direction. The time to collision TTC is a value obtained by dividing the distance between the own vehicle 1 and the object by a speed difference therebetween (relative speed Vr). The time to collision TTC corresponds to the time taken until the object is aligned with the own vehicle 1 in the vehicle traveling direction. The TTC is also referred to as the time remaining to collision.

In the present embodiment, when the speed of the own vehicle 1 is equal to or above a prescribed speed (for example, 30 km/h), the width WY1 of the first area in the vehicle traveling direction is identified by a first threshold TTC1 (for example, four seconds) of the time to collision TTC. Specifically, a front end position Y1 corresponding to the first threshold TTC1 becomes farther from the reference point 36 (the distance D becomes longer), as the relative speed Vr between the own vehicle 1 and the object is higher. Therefore, the physical significance of identifying the front end position Y1 with the constant first threshold TTC1 may be equivalent to making the front end position Y1 variable in accordance with the relative speed Vr (i.e., making the width WY1 of the first area in the vehicle traveling direction variable in accordance with the relative speed Vr) such that the front end position Y1 is farther (the distance D is longer) as the relative speed Vr is higher. In the present embodiment, when the speed of the own vehicle 1 is less than the prescribed speed, the width WY1 is identified by a first threshold D1 (fixed value) of the distance D.

Unlike the above setting technique, when only the first threshold TTC1 is used for identification of the width WY1, the front end position Y1 approaches the reference point 36 more (i.e., the width WY1 becomes narrower), as the relative speed Vr is lower. As a result, at low vehicle speeds, the first threshold TTC1 is satisfied, though the distance between the pedestrian, who advanced into the first area from the side ahead of the own vehicle 1, and the own vehicle 1 becomes too small. Contrary to this, the above technique for setting the first area can appropriately set the width WY1 by using the first threshold TTC1, while preventing the width WY1 of the first area from decreasing below a certain level at the low vehicle speeds.

However, the parameters used for setting the width WY1 of the first area and for determining the presence of the penetration advancing into the first area based on the setting are not limited to the combination of the time to collision TTC and the distance D as in the aforementioned technique. That is, only the time to collision TTC may be used, for example. Alternatively, only the distance D may be used. Specifically, in the region of high vehicle speeds equal to or above the prescribed speed, the time to collision TTC may be replaced with the first threshold D1 (=width WY1) of the distance D, the first threshold D1 being variable to be larger as the speed of the own vehicle 1 is higher. Since the traveling speed of the pedestrian is low, it can be considered that the relative speed Vr is substantially equal to the speed of the own vehicle 1 when the pedestrian is the object. Based on this theory, the physical significance of using the first threshold D1 as in this example is the same as that in the example where the first threshold TTC1 is used.

The rear end of the first area in the Y axis direction does not strictly coincide with the position (X axis position) of the reference point 36. The reason is because the first area is restricted to be ahead of the location of a Y coordinate value of the reference point 36 by an image viewing angle of the camera sensor 14 and a detection angle of the millimeter-wave sensor 12. However, for easier understanding, the image viewing angle of the camera sensor 14 and the detection angle of the millimeter-wave sensor 12 are each assumed to be 180 degrees. This also applies to the second area.

2-2. Second Area

In FIG. 3, in addition to the first area, a second area is set in front of the own vehicle 1 in the own vehicle coordinate system with the reference point 36 as an origin. The second area is set to be larger than the first area in the X axis direction (vehicle width direction) and in the Y axis direction (vehicle traveling direction) of the own vehicle 1. The second area is used to determine the timing of driving the actuator 28 for adjustment of the irradiation direction, prior to irradiation of the pedestrian, who will be an alert target because of advancement into the first area, with light. More specifically, when the pedestrian 34 recognized by the object recognition unit 30 advances into the second area, the pedestrian 34 who advances therein is identified as a pedestrian who is an alert candidate. Accordingly, the actuator 28 starts to be driven such that the irradiation direction faces the pedestrian 34 as illustrated in FIG. 3.

Specifically, the second area is set as follows. That is, a difference $\Delta WY$ ($=WY2-WY1$) between the width WY1 of the first area and the width WY2 of the second area in the Y axis direction (vehicle traveling direction) is set so as to be able to secure the operating time of the actuator 28 necessary for making the irradiation direction face the pedestrian 34 who is an alert candidate. More specifically, it is possible to use, as such operating time, an operating time Td required when the actuator 28 is made to adjust the irradiation direction in the range of a maximum movable width movable by the actuator 28, for example.

In the high-speed region equal to or above the prescribed speed, a second threshold TTC2 of the time to collision TTC is used to identify the width WY2 of the second area in the Y axis direction. The second threshold TTC2 corresponds to the time obtained by adding the operating time Td to the first threshold TTC1 of the time to collision TTC. By setting the second threshold TTC2 in this way, the difference $\Delta WY$ can be set such that the operating time Td of the actuator 28 can be secured until the pedestrian 34 who advanced into the second area advances into the first area. The second threshold TTC2 in the above example may be replaced with a value larger than a sum of the first threshold TTC1 and the operating time (for example, the operating time Td) of the actuator 28.

Meanwhile, in a low speed region where the vehicle speed is less than the prescribed speed, the distance D is used to identify the width WY1 of the first area in the vehicle traveling direction. In the low speed region, a product of the operating time Td and the current speed (or relative speed Vr) of the own vehicle 1 at the present time may be used as the difference $\Delta WY$ to identify the width WY2 of the second area. That is, the width WY2 of the second area is a sum of the width WY1 of the first area and the product (difference ΔWY). Accordingly, as in the case of the high speed region, the operating time Td of the actuator 28 can be secured until the pedestrian 34 who advanced into the second area then advances into the first area. The width WY2 of the second area may be larger than a sum of the width WY1 of the first area and the product (difference ΔWY).

In the present embodiment, the width WX2 of the second area in the vehicle width direction is set to a value larger by a predetermined fixed value than the width WX1 of the first area in one example. As an example of a path of the pedestrian who approaches the own vehicle 1, the example where the pedestrian approaches the own vehicle 1 from the direction diagonally in front of the own vehicle 1 may be considered. When such an example is considered, it may be assumed that the time from advancement into the second area to advancement into the first area is shortened when the width WX2 of the second area is equal to the width WX1 of the first area. As a solution, the width WX2 is set to be larger than the width WX1 as in the setting example illustrated in FIG. 3. As a consequence, even when the pedestrian approaches the own vehicle 1 from the direction diagonally in front of the own vehicle 1 as in the above example, the time from advancement into second area to advancement into the first area can be lengthened. As a result, even in such an approaching example, adjustment of the irradiation direction by the actuator 28 can be completed more reliably before the pedestrian advances into the first area.

The difference between the width WX2 and the width WX1 may be changed from the fixed value in the above example to a value that becomes larger when the speed of the own vehicle 1 is low and becomes lower when the speed is high. When the speed of the own vehicle 1 is low, the pedestrian can more easily move from a location diagonally in front of the own vehicle 1 to a location in front of the own vehicle 1 until the own vehicle 1 overtakes the pedestrian as compared with when the speed of the own vehicle 1 is high. Accordingly, in the example where the pedestrian approaches the own vehicle 1 from the location diagonally in front of the own vehicle 1, making the difference (WX2−WX1) variable as described above enables the actuator 28 to more reliably complete the adjustment of the irradiation direction before the pedestrian advances into the first area, when the speed of the own vehicle 1 is low.

Figure 4:
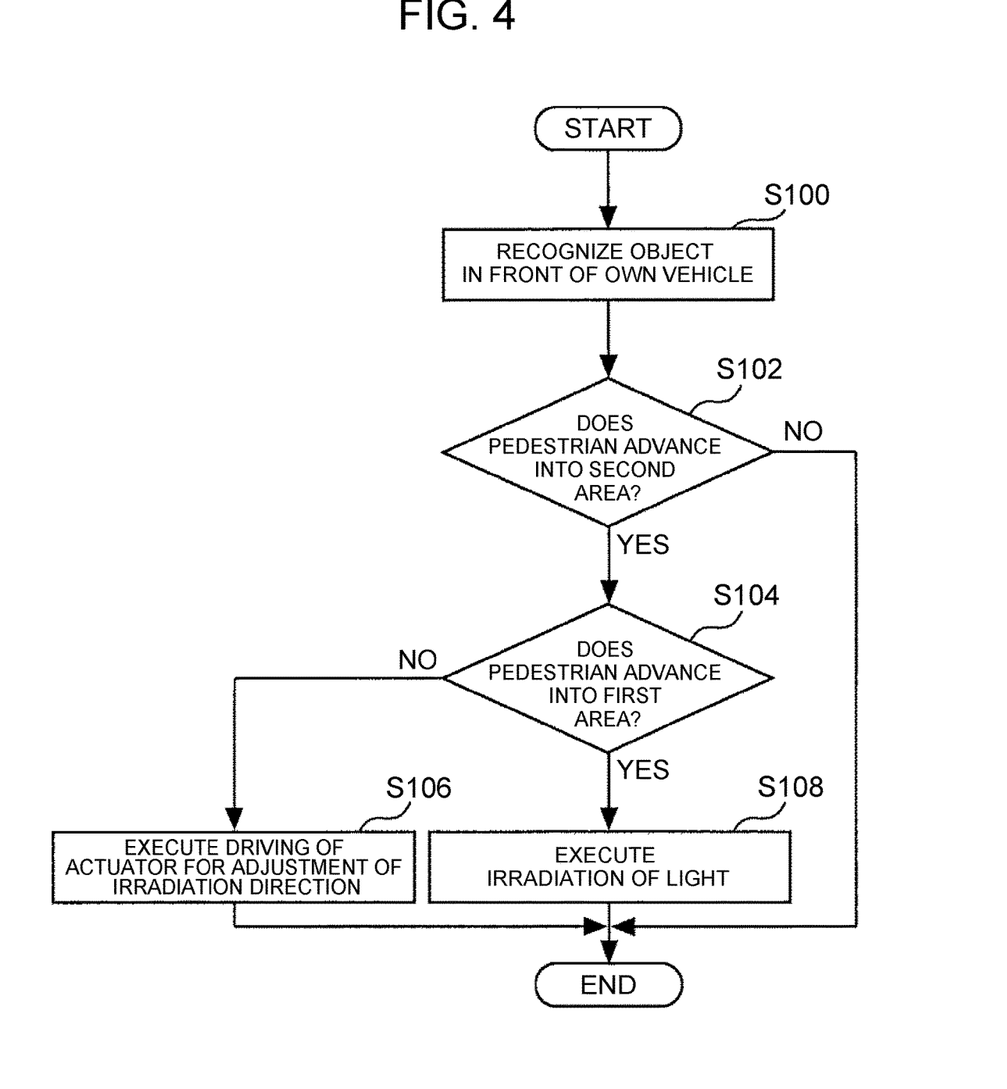
FIG. 4 is a flowchart illustrating a processing routine with respect to the light irradiation control according to the first embodiment of the present disclosure.

2-3. Example of ECU Processing with Respect to Light Irradiation Control in First Embodiment FIG. 4 is a flowchart illustrating a processing routine with respect to light irradiation control according to the first embodiment of the present disclosure. The ECU 16 repeatedly executes processing of the present routine at a prescribed period during driving of the vehicle 1 (when the mutual recognition support is required to be more specific).

The object recognition unit 30 executes the processing of step S100 in the routine illustrated in FIG. 4. In step S100, the object recognition unit 30 applies image recognition processing to an image received from the camera sensor 14 to recognize objects in front of the own vehicle 1. The information on the recognized objects is transmitted to the light irradiation control unit 32 from the object recognition unit 30.

The light irradiation control unit 32 executes processing of steps S102 to S108. In step S102, the light irradiation control unit 32 determines whether or not the objects recognized by the object recognition unit 30 include a pedestrian, and the pedestrian advanced into the second area.

Specifically, when the speed of the own vehicle 1 is equal to or above the prescribed speed, whether or not the pedestrian advanced into the second area is determined based on whether the time to collision TTC of the pedestrian is less than the second threshold TTC2, and a transverse position X of the pedestrian (X coordinate value in the own vehicle coordinate system) is within a second threshold (width WX2 in FIG. 3). When the speed of the own vehicle 1 is less than the prescribed speed, whether or not the pedestrian advanced into the second area is determined based on whether a position Y of the pedestrian in the vehicle traveling direction (Y coordinate value in the own vehicle coordinate system) is within a second threshold (the width WY2 in FIG. 3), and the transverse position X of the pedestrian is within the second threshold (width WX2).

When the objects recognized by the object recognition unit 30 include a plurality of pedestrians, determination of step S102 is executed with the pedestrian having a shortest distance to the own vehicle 1 as a target, for example.

In the case where the objects recognized by the object recognition unit 30 do not include any pedestrian, the case where the objects include a pedestrian but the pedestrian does not advance into the second area, or the case where the pedestrian advances into the second area and then goes out of the second area, a negative determination is made in step S102.

When a positive determination is made in step S102, the pedestrian who advanced into the second area becomes an alert candidate. In this case, in step S104, the light irradiation control unit 32 determines whether or not the pedestrian (alert candidate) who was in the second area advanced into the first area.

Specifically, when the speed of the own vehicle 1 is equal to or above the prescribed speed, the light irradiation control unit 32 detects whether or not the pedestrian advanced into the first area based on whether the time to collision TTC of the pedestrian (alert candidate) is less than the first threshold TTC1, and the transverse position X of the pedestrian is within a first threshold (width WX1 in FIG. 3). When the speed of the own vehicle 1 is less than the prescribed speed, the light irradiation control unit 32 determines whether or not the pedestrian advanced into the first area based on whether the position Y of the pedestrian in the vehicle traveling direction is within a first threshold (width WY1 in FIG. 3), and the transverse position X of the pedestrian is within the first threshold (width WX1).

When the light irradiation control unit 32 determines that the pedestrian does not advance into the first area in step S104, then in step S106, the actuator 28 is driven such that the irradiation direction faces the pedestrian (alert candidate). While the determination result of step S104 is negative, driving of the actuator 28 is executed until the adjustment of the irradiation direction is completed. When the adjustment of the irradiation direction is incomplete in the above case (where the pedestrian advances into the second area and then goes out of the second area), the adjustment of the irradiation direction is interrupted with loss of the pedestrian (alert candidate).

Figure 5:
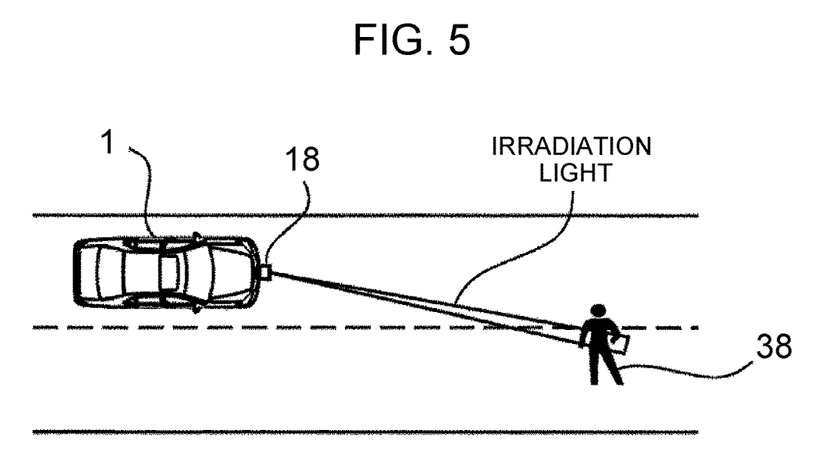
FIG. 5 illustrates an example of irradiation of light under the light irradiation control.

Meanwhile, when the light irradiation control unit 32 determines that the pedestrian advanced into the first area in step S104, the pedestrian becomes an alert target. In this case, in step S108, the light irradiation control unit 32 irradiates the pedestrian (alert target) with light by using the irradiation device 18. The irradiation is executed over a specified irradiation time. FIG. 5 illustrates an example of irradiation of light under the light irradiation control. In the example illustrated in FIG. 5, the road surface in front of a pedestrian 38 to be alerted is irradiated with linear irradiation light.

3. Effect of Light Irradiation Control in First Embodiment

The light irradiation control in the present embodiment described before sets the first area that is to be irradiated with light upon advancement of the pedestrian, as well as the second area larger in both the vehicle traveling direction and the vehicle width direction than the first area. When the pedestrian advanced into the second area, the actuator 28 is driven such that the irradiation direction faces the pedestrian (alert candidate) who advanced into the second area, prior to irradiation of light.

Accordingly, the combined use of the second area having an enlarged width in the vehicle traveling direction makes it possible to secure the operating time of the actuator 28 necessary for the adjustment of the irradiation direction, before the pedestrian (alert candidate) first advances into the second area from the location ahead of the own vehicle 1 and then advances into the first area. Accordingly, when the pedestrian advances into the first area after the second area, the pedestrian can effectively be irradiated with light, while a delay in alerting can be suppressed.

In the example where the pedestrian advances into the second area from the direction diagonally in front of the own vehicle 1, the combined use of the second area having an enlarged width in the vehicle width direction makes it possible to further lengthen the time from the advancement into the second area to the advancement into the first area. This enables the actuator 28 to more reliably complete the adjustment of the irradiation direction before the pedestrian advances into the first area. Accordingly, also in this example, when the pedestrian advances into the first area after the second area, the pedestrian can effectively be irradiated with light, while a delay in alerting can be suppressed.

Second Embodiment

Now, a second embodiment of the present disclosure will be described with reference to FIGS. 6 and 7. In the following description, the configuration of the recognition support device 10 illustrated in FIGS. 1 and 2 is used as an example of the configuration of a recognition support device for a vehicle of the second embodiment.

1. Light Irradiation Control in Second Embodiment

The light irradiation control according to the present embodiment is different from the light irradiation control according to the first embodiment in the following point. That is, in the present embodiment, when a pedestrian (alert candidate) advances into the first area, it is determined whether or not the collision prediction position XC of the pedestrian in the vehicle width direction is within a specified range. When the collision prediction position XC is out of the specified range, the pedestrian is not irradiated (alert candidate) with light even in the case where the pedestrian advances into the first area.

1-1. Determination Processing of Collision Prediction Position XC

Figure 6:
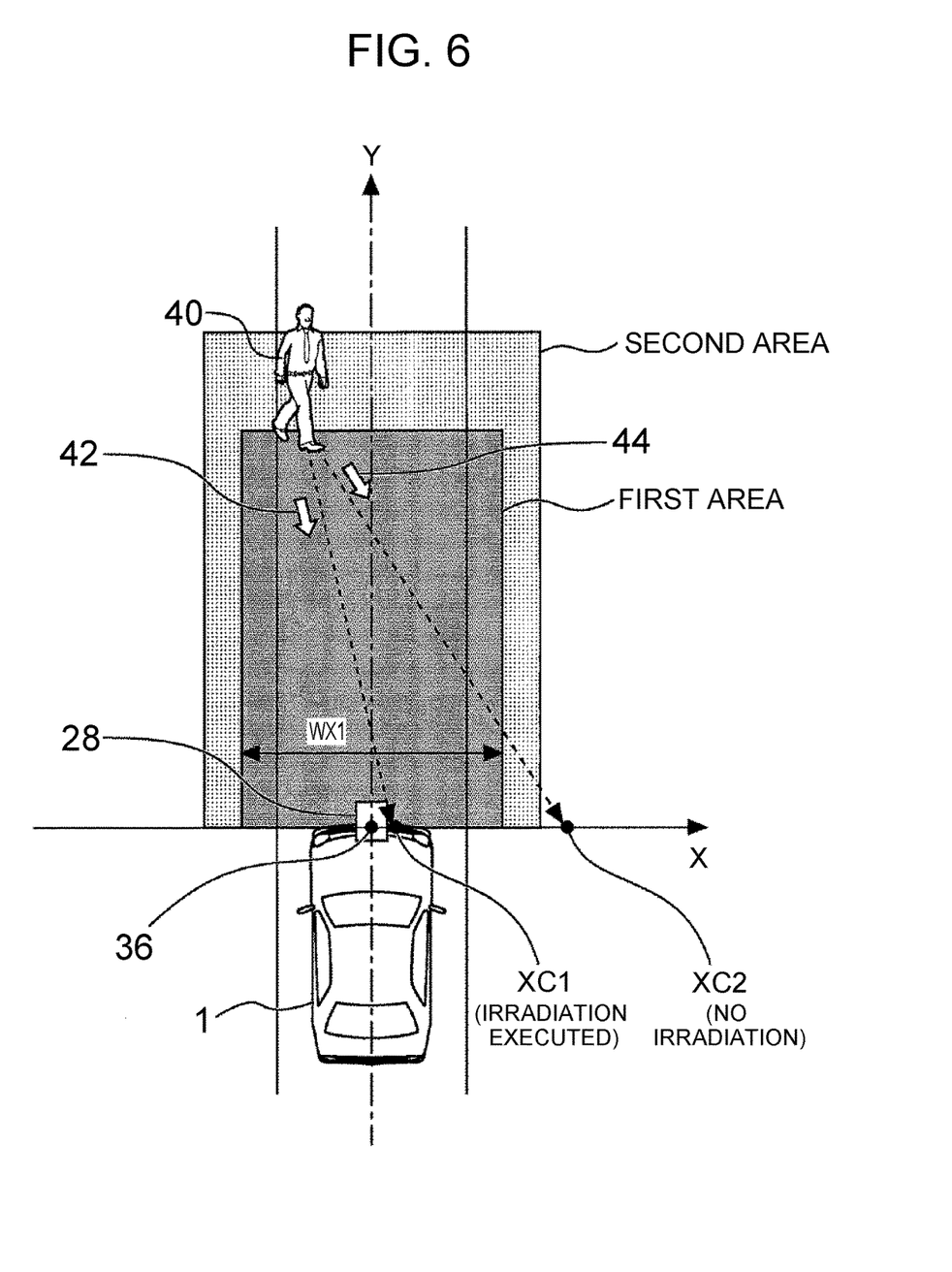
FIG. 6 is an explanatory view illustrating determination processing of a collision prediction position XC.

FIG. 6 is an explanatory view illustrating determination processing of the collision prediction position XC. More specifically, the collision prediction position XC herein refers to the position of a pedestrian 40 in the vehicle width direction, the position being obtained when the pedestrian 40 is aligned with the own vehicle 1 in the vehicle traveling direction. That is, the collision prediction position XC is a transverse position X (X coordinate value) of the pedestrian 40 obtained when the pedestrian 40 moves to an X-axis position (Y coordinate value zero) in the own vehicle coordinate system in the future.

The collision prediction position XC can be calculated by the following technique, for example. That is, a movement vector (for example, movement vectors 42, 44 in FIG. 6) of the pedestrian 40 is calculated from the history of the positional coordinates of the pedestrian 40 in the own vehicle coordinate system. The movement vector is calculated by approximating a plurality of transverse positions X (X coordinate values) of the pedestrian 40, including previous and older transverse positions X, by straight line fitting. Based on the calculated movement vector and the positional coordinates of the pedestrian 40 at the present moment, the collision prediction position XC is calculated. The thus-calculated collision prediction position XC is updated with a control period of the ECU 16.

In the present embodiment, the width WX1 of the first area in the vehicle width direction can be used for example, as the specified range used for determination of the calculable collision prediction position XC as mentioned before. FIG. 6 illustrates two examples XC1, XC2 of the collision prediction position XC of the pedestrian 40 immediately after the pedestrian 40 advanced into the first area. The collision prediction position XC1 is within the specified range WX1, while the collision prediction position XC2 is out of the specified range WX1. The specified range may be different from the width WX1 of the first area.

In the light irradiation control of the present embodiment, when the collision prediction position XC of the pedestrian 40 who advanced into the first area is XC1, irradiation of the pedestrian 40 with light is executed. Meanwhile, when the collision prediction position XC of the pedestrian 40 is XC2, irradiation of the pedestrian 40 with light is not executed.

1-2. Example of ECU Processing with Respect to Light Irradiation Control in Second Embodiment FIG. 7 is a flowchart illustrating a processing routine with respect to light irradiation control according to the second embodiment of the present disclosure. The processing of steps S100 to S108 in the routine illustrated in FIG. 7 is as described in the first embodiment.

Figure 7:
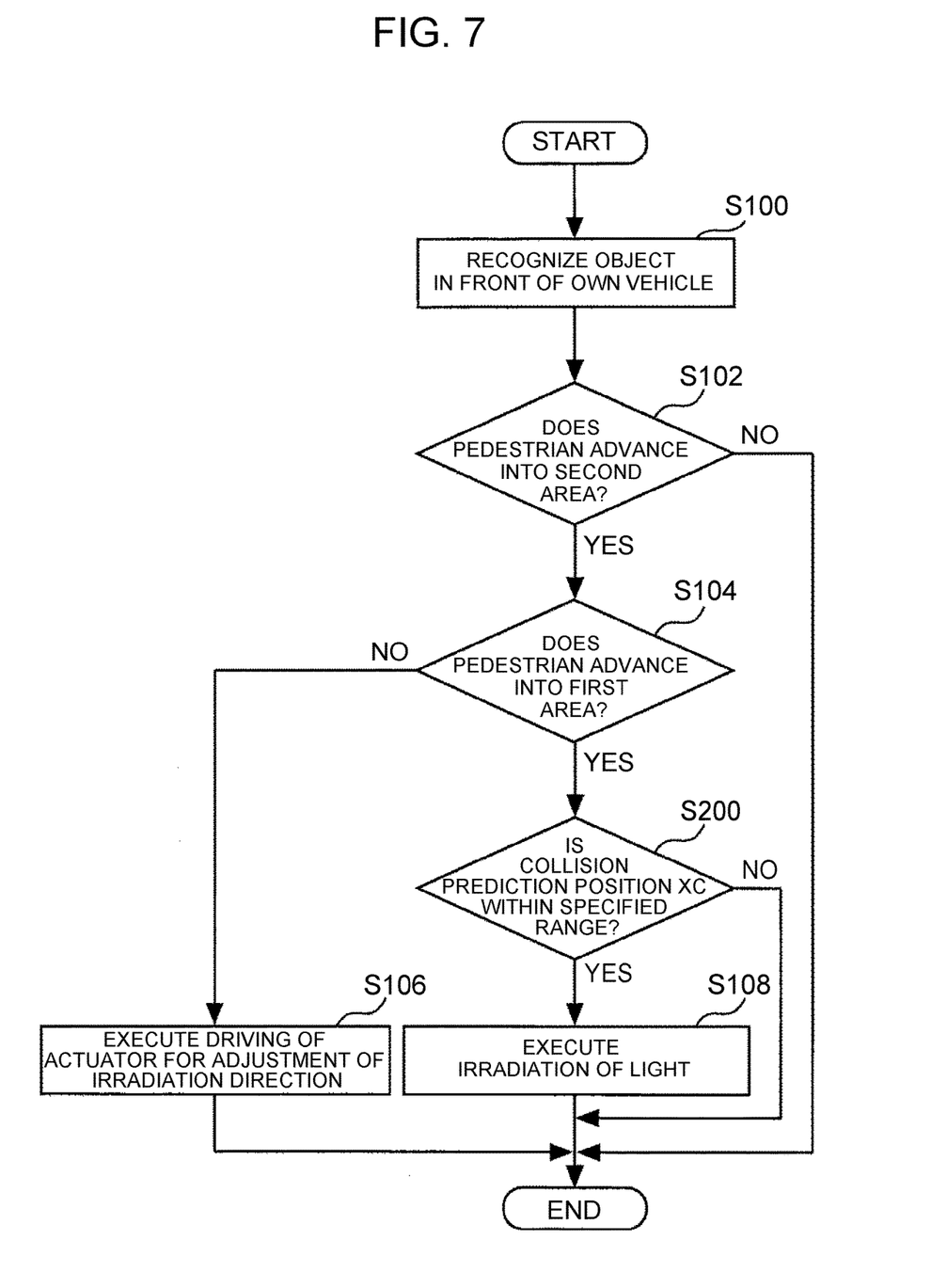
FIG. 7 is a flowchart illustrating a processing routine with respect to light irradiation control according to a second embodiment of the present disclosure.

In the routine illustrated in FIG. 7, when the light irradiation control unit 32 determines that the pedestrian advanced into the first area in step S104, then the processing proceeds to step S200. In step S200, the light irradiation control unit 32 acquires a latest collision prediction position XC, and determines whether or not the collision prediction position XC is within the specified range.

As a result, when the determination result of step S200 is positive, that is, when the light irradiation control unit 32 can determine that there is a high risk of a collision of the pedestrian with the own vehicle 1, the processing proceeds to step S108, where the pedestrian (alert target) is irradiated with light. Meanwhile, when the determination result of step S200 is negative, that is, when the light irradiation control unit 32 can determine that the risk of a collision of the pedestrian with the own vehicle 1 is sufficiently low, the light irradiation control unit 32 ends the processing cycle in the present routine, without executing irradiation of the pedestrian (alert target) with light.

2. Effects of Light Irradiation Control in Second Embodiment

In the light irradiation control of the second embodiment described in the foregoing, even when the pedestrian advances into the first area after the adjustment of the irradiation direction toward the pedestrian (alert candidate) who advanced into the second area is performed, light irradiation is not executed in the situation where the risk of a collision of the pedestrian with the own vehicle 1 is sufficiently low based on the collision prediction position XC. This makes it possible to suppress unnecessary irradiation of the pedestrian who does not need irradiation for alerting since the risk of the collision is sufficiently low. The actuator 28 may also be put in a standby state such that next adjustment of the irradiation direction can swiftly be performed.

Other Embodiments

Another Setting Example of Second Area

In the first and second embodiments, the second area larger in both the vehicle traveling direction and the vehicle width direction than the first area is used. However, the second area according to the present disclosure may be set to be larger only in the width in the vehicle traveling direction than the first area.

Examples and other modifications in the embodiments described in the foregoing may suitably be used in combinations, other than the disclosed combinations, within a practicable range. Various deformations may also be possible without departing from the meaning of the present disclosure.

What is claimed is:

1. A recognition support device for a vehicle, comprising:
an irradiation device configured to irradiate an area in front of an own vehicle with light, the irradiation device having an actuator configured to change an irradiation direction of the light; and
circuitry configured to
recognize an object present in front of the own vehicle with a sensor,
irradiate, when a specific object advances into a first area after advancing into a second area, the specific object with the light by using the irradiation device, the first area being set in front of the own vehicle relative to the own vehicle, and
before the specific object advances into the first area and when the specific object advances into the second area, drive the actuator without irradiating the specific object with the light, such that the irradiation direction of the irradiation device faces the specific object that advances into the second area, the second area being larger at least in a width in a vehicle traveling direction than the first area.

2. The recognition support device according to claim 1, wherein
the second area is larger in a width in a vehicle width direction than the first area.

3. The recognition support device according to claim 1, wherein
the circuitry is configured
to determine whether or not a collision prediction position is within a specified range, the collision prediction position being a position of the specific object in a vehicle width direction obtained when the specific object advances into the first area, and the specific object is aligned with the own vehicle in the vehicle traveling direction,
to irradiate the specific object with the light by using the irradiation device when the collision prediction position is within the specified range, and
not to irradiate the specific object with the light by using the irradiation device when the collision prediction position is out of the specified range.

4. The recognition support device according to claim 1, wherein
a difference between the width of the second area and the width of the first area in a vehicle width direction is larger when a speed of the own vehicle is low than when the speed of the own vehicle is high.

5. The recognition support device according to claim 1, wherein the circuitry is configured to irradiate the specific object with the light only when the specific object has advanced into the first area.

6. A recognition support device for a vehicle, comprising:
an irradiation device configured to irradiate an area in front of an own vehicle with light, the irradiation device having an actuator configured to change an irradiation direction of the light; and
circuit configured to
recognize an object present in front of the own vehicle with a sensor,
irradiate, when a specific object advances into a first area, the specific object with the light by using the irradiation device, the first area being set in front of the own vehicle relative to the own vehicle, and
drive the actuator, when the specific object advances into a second area before advancing into the first area, such that the irradiation direction of the light from the irradiation device faces the specific object that advances into the second area, the second area being larger at least in a width in a vehicle traveling direction than the first area, wherein
the width of the first area in the vehicle traveling direction and the width of the second area in the vehicle traveling direction are each determined with use of time to collision between the own vehicle and the specific object, and
a second threshold of the time to collision, used to determine the width of the second area in the vehicle traveling direction, is equal to or larger than a sum of a first threshold of the time to collision and an operating time of the actuator, the first threshold being used to determine the width of the first area in the vehicle traveling direction, the operating time being necessary for adjustment of the irradiation direction.

7. A recognition support device for a vehicle, comprising:
an irradiation device configured to irradiate an area in front of an own vehicle with light, the irradiation device having an actuator configured to change an irradiation direction of the light; and
circuit configured to
recognize an object present in front of the own vehicle with a sensor,
irradiate, when a specific object advances into a first area, the specific object with the light by using the irradiation device, the first area being set in front of the own vehicle relative to the own vehicle, and
drive the actuator, when the specific object advances into a second area before advancing into the first area, such that the irradiation direction of the light from the irradiation device faces the specific object that advances into the second area, the second area being larger at least in a width in a vehicle traveling direction than the first area, wherein
the width of the first area in the vehicle traveling direction and the width of the second area in the vehicle traveling direction are each determined with use of a distance from a reference point on the own vehicle in the vehicle traveling direction, and
a second threshold of the distance used to determine the width of the second area in the vehicle traveling direction is equal to or larger than a sum of a product and a first threshold of the distance, the product being between an operating time of the actuator to adjust the irradiation direction and a speed of the own vehicle or a relative speed between the own vehicle and the specific object, the first threshold being used to determine the width of the first area in the vehicle traveling direction.

8. A recognition support device for a vehicle, comprising:
an irradiation device configured to irradiate an area in front of an own vehicle with light, the irradiation device having an actuator configured to change an irradiation direction of the light; and
circuitry configured to
  recognize an object present in front of the own vehicle with a sensor,
  based upon a determination that a specific object has advanced into a second area, determine whether the specific object has advanced into a first area, wherein the second area is larger at least in a width in a vehicle traveling direction than the first area, the first area being set in front of the own vehicle relative to the own vehicle,
  based upon a determination that the specific object has not advanced into the first area, drive the actuator without irradiating the specific object with the light, so that the irradiation direction of the irradiation device faces the specific object, and
  based upon a determination that the specific object has advanced into the first area, irradiate the specific object with the light by using the irradiation device.

* * * * *